ns of Stark and State of Ohio, have
UNITED STATES PATENT OFFICE.

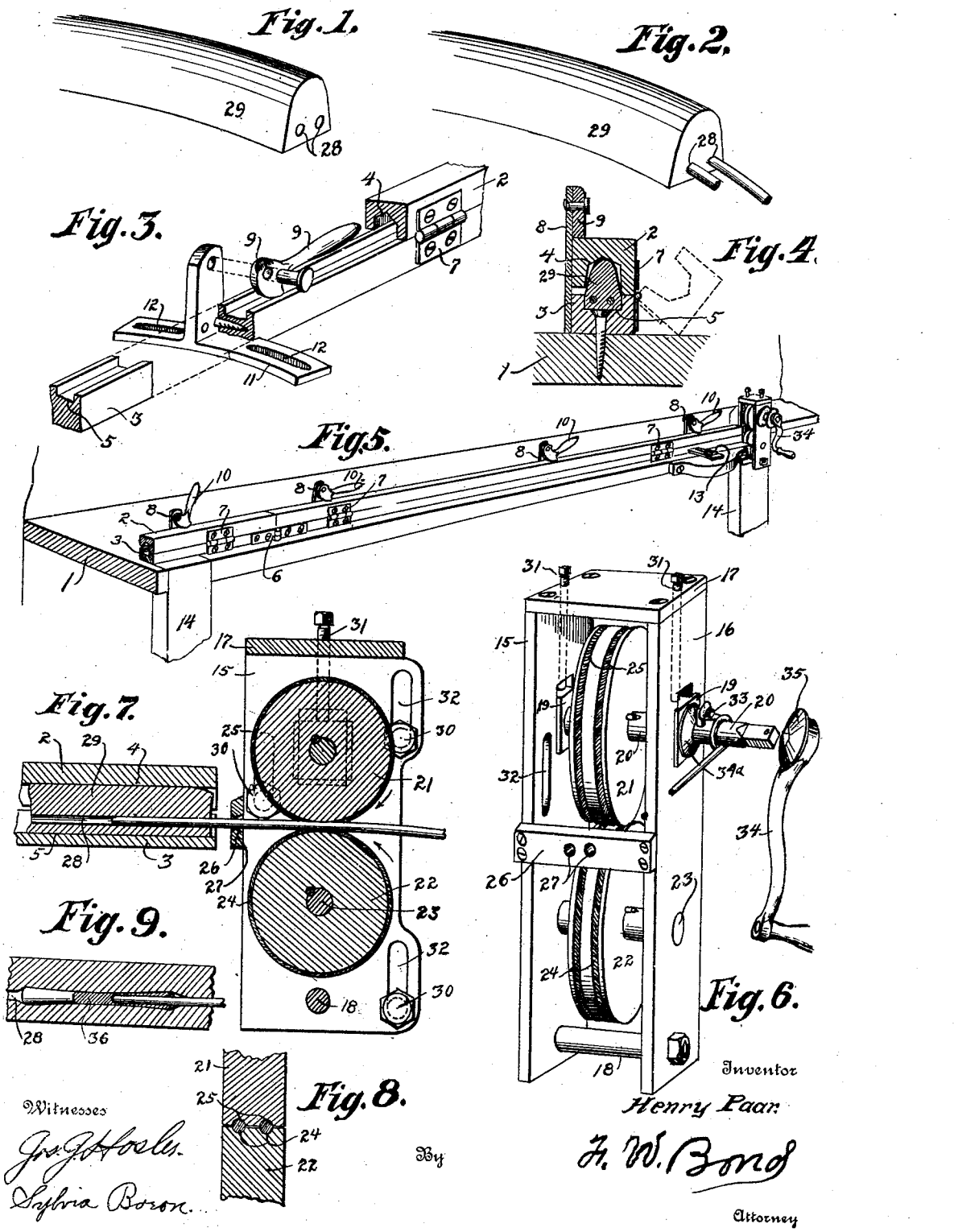

HENRY PAAR, OF CANTON, OHIO.

MACHINE FOR INSERTING AND WITHDRAWING TIRE-WIRES.

No. 840,799.  Specification of Letters Patent.  Patented Jan. 8, 1907.

Application filed August 27, 1906. Serial No. 332,130.

*To all whom it may concern:*

Be it known that I, HENRY PAAR, a citizen of the United States, residing at Canton, in the county of Stark and State of Ohio, have invented certain Improvements in Machines for Inserting and Withdrawing Tire-Wires; and I do hereby declare that the following is a full, clear, and exact description of the same, reference being had to the accompanying drawings, making a part of this specification.

The object of the present invention is to provide convenient means whereby metallic wires or bars can be inserted into the apertures formed in the tire and also to remove the wires or bars for the purpose of placing new wires or bars, or for any other purpose.

The different figures of the drawings represented in my invention are as follows:

Figure 1 is a view showing a portion of a tire, showing the wires removed or before any wires are inserted. Fig. 2 is a similar view showing two wires in proper relative position with reference to the tire. Fig. 3 is a perspective view showing portions of the tire-clamp members, illustrating the holding-bracket placed in proper relative position. Fig. 4 is a transverse section of the clamp members, showing a tire clamped. Fig. 5 is a perspective view showing the different parts properly arranged with reference to each other. Fig. 6 is a view showing the wire inserting and withdrawing device detached or separate from the tire-clamp. Fig. 7 is a vertical section showing a portion of the tire-clamp, the wire-inserting rolls, and a wire partially inserted in the tire. Fig. 8 is a sectional view showing portions of the wire-rolls. Fig. 9 is a longitudinal section showing a portion of a tire and illustrating a rust and dirt removing head connected to the wire to be inserted and the wire partially inserted in the tire.

Similar numerals of reference indicate corresponding parts in all the figures of the drawings.

In the accompanying drawings, 1 represents a bench or support which may be of the form shown, or it may be of any other desired form, as its only object is to support and hold the tire-clamp members 2 and 3, which clamp members are provided with the longitudinal grooves 4 and 5, which grooves are for the purpose of providing suitable space to receive the tire and should be formed of such a size that when the clamp members 2 and 3 are brought into the position illustrated in Figs. 4 and 5 the tire will be held parallel with the clamp members 2 and 3. The clamp members 2 and 3 must necessarily be formed of considerable length, owing to the fact that their length must correspond with the length of the tire when the tire is extended or straightened out.

For the purpose of convenience in shipping or storing, the clamp members when not in use and lower clamp member should be provided with a hinge 6, located about midway between its extreme ends, or any other desired number of hinged sections may be employed. The manner of hinging the clamp-section, however, is mechanical; but I prefer and deem it of importance to provide at least one or more hinges for the purpose above pointed out.

For the purpose of convenience in placing the tire designed to be wired between the clamp members 2 and 3 said clamp members should be hinged together by means of the hinges 7, which hinges may be of the form shown, or they may be of any other desired form, as the only object is to provide a means to turn the upper member 2 into the position illustrated in dotted lines, Fig. 4, and when so placed a tire can be laid in the groove of the lower member 3 and the upper member brought into the position illustrated in the drawings and clamped.

For the purpose of holding the members in a clamped position a series of bars 8 are secured to the lower clamp member 3 in any convenient and well-known manner, and to the top or upper ends of said clamp members are pivotally connected the eccentric clamps 9, which are provided with the handles 10. Near the front or forward end of the clamp members is located the bracket 11, which bracket is secured to the lower clamp member 3 in any convenient and well-known manner and is provided with the curved slots 12, through which curved slots the lug-bolts 13 are passed, said lug-bolts being secured to the bench 1 or any other support. The object and purpose of providing the bracket 11 and forming the slots 12 therein is to provide a means for properly adjusting the clamp members for the purpose hereinafter described. Near the front end of the clamp members 2 and to the post 14 or its equivalent is attached a housing, which housing consists of the vertical members 15 and 16, which members are held in proper spaced relationship with reference to each other by the cap or tie plate 17 and the bolt 18. The vertical members 15 and 16 are each provided with the adjustable bearings 19, in which adjustable bearings is journaled the shaft 20, upon which shaft the upper grooved wheel 21 is mounted and is so attached that the wheel will be rotated with the rotation of the shaft 20. Directly below the wheel 21 is located the wheel 22, which wheel is mounted upon the shaft 23, which shaft is journaled in the vertical members 15 and 16. The wheels 21 and 22 (herein shown) are each provided with two grooves 24 and 25, which grooves are located directly opposite each other, as best illustrated in Fig. 8, and are so located for the purpose of properly spacing the wires designed to be forced into the tire.

For the purpose of causing the wires to move between the wheels 21 and 22 the grooves formed upon the peripheries of said wheels are provided with roughened surfaces.

For the purpose of clamping the wires as they are moved longitudinally the lower wheel 22 is provided, which lower wheel is simply for the purpose of providing a means for properly holding the wire or, in other words, providing two rotatable parts or wheels upon which the tops and bottoms of the wires rest. Upon the edges of the vertical members 15 and 16 is attached the bar 26, which bar is provided with apertures 27, said apertures being for the purpose of assisting in holding the wires or acting as guides, so that the wires will be properly directed into the apertures 28, formed in the tire 29. In the drawings I have illustrated two wires; but I do not desire to be confined to any number of wires, nor is it necessary that the wires be round, as shown, as it is well understood that flat bars of suitable size can be inserted in the same manner as the round wires herein shown are inserted.

It will be understood that when a tire is placed between the clamp members 2 and 3 and properly clamped it cannot spring or bend, but will be held rigid and in proper position to receive the wires as they are moved longitudinally by means of the grooved wheels 21 and 22, the wheel 21 acting as the driving-wheel and the wheel 22 as an idler so far as the action of the propelling force is concerned. After the wires have been properly inserted in the ties the upper clamp member is released, and the tire, together with the wires located therein, removed, after which another tire can be placed in position and the operation continued.

For the purpose of providing suitable means for holding the housing proper one of the members must be attached to some fixed object, such as the post 14, by means of the bolts 30 or their equivalents.

For the purpose of forcing the wheel 21 down and upon the wire the screws 31 are provided, the lower ends of which come in contact with the top or upper ends of the bearings 19.

For the purpose hereinafter described the bolts 30 are passed through the slots 32, formed in the attached housing member 15. When it is desired to remove wires from an old tire, the tire is placed between the clamping members 2 and 3 in the same manner that it is placed when wires are to be inserted and the wire designed to be removed connected to the pin 33 and the shaft 20 rotated, so as to wind the wire around the extended portion of the shaft 20, to which extended portion is attached the crank 34.

For the purpose of forming what might be termed a "spool" the beveled flanges 34$^a$ and 35 are provided, the flange 34$^a$ being fixed to the shaft 20 and the flange 35 being attached or formed integral with the crank 34. After a wire has been removed from an old tire the crank 34 is removed and the wire stripped from the extended portion of the shaft 20, after which another wire may be removed in the same manner.

For the purpose of bringing the shaft 20 into proper alinement with the clamped tire the housing should be lowered, which is done by loosening the bolts 30, after which the housing can be set down a sufficient distance to allow a straight pull upon the wire as it is removed. For the purpose of providing this adjustment the slots 32 are provided. It will also be understood that the forward ends of the clamp members should be moved laterally, so that they will come nearly opposite the extended portion of the shaft 20, and in order to provide for this adjustment the bracket 11 is provided with the curved slots 12, it being understood that the lug-bolts must be loosened before any lateral adjustment of the clamp members 2 and 3 can be made, and after said clamp members are brought into the desired adjustment said lug-bolts should be tightened. In placing new wires in old tires it is of importance that the rust adhering to the surface should be removed and any gritty substance that may have accumulated, and in order that this object may be accomplished I provide a detachable scraper-head 36, which detachable scraper-head may be of the form shown, or it may be of any other desired form, as its only object is to remove any foreign substance that may have accumulated during the time the tire has been in use. It will be understood that the scraper-head is to be removed after the wire has been forced through the tire-aperture.

For the purpose of preventing the wire or wires from bending during the time they are moved by the wheels 21 and 22 the grooves 24 and 25 are roughened by forming a series of alternating ridges and grooves, preferably located at an angle to the axles or shaft upon which the wheels are mounted. The inclinations should be reversed upon the opposite grooves, so that the wire or wires will be fed in a true horizontal plane. Another object in providing the grooves with alternating ridges and grooves and locating said alternating grooves and ridges at opposite angles is to prevent the wire from stretching more upon one part than the other, thereby preventing any bending or stretching of the wires during the time they are moved longitudinally, it being understood that the wires must be of considerable length, and more or less friction is brought upon the wires as they are forced through the tires; but by the peculiar formation of the wheels the wires are fed in a true horizontal line without danger of springing in any way and the wires remaining in the original form.

Having fully described my invention, what I claim as new, and desire to secure by Letters Patent, is—

1. In a machine for inserting and withdrawing tire-wires, the combination of tire-clamping members provided with grooves, the lower clamp member provided with a series of bars, eccentric clamps pivoted to said bars, a housing having journaled therein shafts, wheels provided with grooves upon their peripheries, said grooves having a series of alternating ridges and grooves located at opposite angles as between the wheels and at an angle to the shafts, upon which said wheels are mounted, substantially as and for the purpose specified.

2. In a machine of the class described, the combination of a housing, shafts journaled therein, wire-feeding wheels mounted upon the shafts, one of said shafts adapted to receive the crank, said shaft provided with a flange, means for connecting a tire-wire to said flange, a crank provided with a flange and tire-clamping members hinged together, means for clamping said tire-clamping members, one of said members provided with a slotted bracket, means for holding the bracket and tire-clamping members in fixed position, substantially as and for the purpose specified.

3. In a machine of the class described, the combination of tire-clamping members hinged together, means for clamping the tire-clamping members together, a housing having journaled therein shafts, wheels mounted upon said shafts, said wheels provided with wire-feeding grooves, and a wire-guide bar secured to the housing, substantially as and for the purpose specified.

4. The combination of a housing, shafts journaled therein and provided with tire-wire-feeding wheels, tire-clamping members hinged together, a scraper-blade detachably connected to the tire-wires, substantially as and for the purpose specified.

In testimony that I claim the above I have hereunto subscribed my name in the presence of two witnesses.

HENRY PAAR.

Witnesses:
F. W. BOND,
W. S. MALONE.